US010302064B2

(12) United States Patent
Clingman et al.

(10) Patent No.: US 10,302,064 B2
(45) Date of Patent: May 28, 2019

(54) METHODS AND SYSTEMS FOR ROTARY WING ACTIVE FLOW CONTROL

(71) Applicant: The Boeing Company, Chicago, IL (US)

(72) Inventors: Daniel J. Clingman, Seattle, WA (US); Randy Lee M. Mallari, Allen Park, MI (US)

(73) Assignee: The Boeing Company, Chicago, IL (US)

( * ) Notice: Subject to any disclaimer, the term of this patent is extended or adjusted under 35 U.S.C. 154(b) by 431 days.

(21) Appl. No.: 14/813,216

(22) Filed: Jul. 30, 2015

(65) Prior Publication Data

US 2017/0029102 A1 Feb. 2, 2017

(51) Int. Cl.
| | |
|---|---|
| *B64C 21/04* | (2006.01) |
| *F03D 1/06* | (2006.01) |
| *B64C 27/00* | (2006.01) |
| *F03D 7/02* | (2006.01) |

(52) U.S. Cl.
CPC ............ *F03D 1/0675* (2013.01); *B64C 21/04* (2013.01); *B64C 27/001* (2013.01); *F03D 7/022* (2013.01); *B64C 2230/22* (2013.01); *B64C 2230/28* (2013.01); *F03D 7/0232* (2013.01); *F03D 7/0256* (2013.01); *F03D 7/0296* (2013.01); *Y02E 10/721* (2013.01); *Y02E 10/723* (2013.01); *Y02T 50/166* (2013.01); *Y02T 50/66* (2013.01)

(58) Field of Classification Search
None
See application file for complete search history.

(56) References Cited

U.S. PATENT DOCUMENTS

| | | | |
|---|---|---|---|
| 4,534,704 A | 8/1985 | McArdle | |
| 5,813,625 A * | 9/1998 | Hassan | B64C 23/06 244/17.11 |
| 6,203,269 B1 * | 3/2001 | Lorber | B64C 11/18 244/207 |
| 6,866,234 B1 | 3/2005 | Hassan et al. | |
| 7,104,143 B1 | 9/2006 | Powell | |
| 7,246,529 B1 | 7/2007 | Powell | |
| 7,305,893 B2 | 12/2007 | Powell et al. | |

(Continued)

OTHER PUBLICATIONS

Kohana Technologies, Blown Wing Technology, Paul Lees, Feb. 26, 2014.*

(Continued)

*Primary Examiner* — Jason D Shanske
*Assistant Examiner* — Theodore Ribadeneyra
(74) *Attorney, Agent, or Firm* — McDonnell Boehnen Hulbert & Berghoff LLP

(57) ABSTRACT

Within examples, systems for enhanced performance blades for rotor craft are provided and methods for operation. An example system for a rotary device is provided comprising a rotor blade coupled to a rotor hub. The system also comprises an air channel disposed within the rotor blade, where the air channel is sealed proximate to a distal end of the rotor blade. The system also comprises an inlet positioned at a proximal end of the rotor blade, where the inlet is in fluid communication with the air channel. The system also comprises a plurality of outlets positioned along the rotor blade, where each of the plurality of outlets are in fluid communication with the air channel.

18 Claims, 6 Drawing Sheets

(56) References Cited

U.S. PATENT DOCUMENTS

| | | | |
|---|---|---|---|
| 7,354,247 B2* | 4/2008 | Bonnet | F03D 1/0633 |
| | | | 415/905 |
| 7,980,516 B2 | 7/2011 | Birchette | |
| 8,157,528 B1 | 4/2012 | Khozikov et al. | |
| 8,267,665 B2 | 9/2012 | Rawdon et al. | |
| 8,714,945 B2 | 5/2014 | Birchette | |
| 8,784,057 B2 | 7/2014 | Podgurski | |
| 2004/0169108 A1* | 9/2004 | Terpay | B64C 27/615 |
| | | | 244/17.11 |
| 2009/0169378 A1* | 7/2009 | Menke | F03D 7/0224 |
| | | | 416/1 |
| 2011/0229329 A1* | 9/2011 | Occhipinti | B64C 11/16 |
| | | | 416/223 R |
| 2013/0022463 A1* | 1/2013 | Zuteck | F03D 7/022 |
| | | | 416/1 |
| 2013/0224017 A1* | 8/2013 | Scott | B64C 27/325 |
| | | | 416/1 |
| 2013/0277502 A1* | 10/2013 | Bauer | B64C 21/08 |
| | | | 244/208 |
| 2013/0284273 A1* | 10/2013 | Boespflug | B64C 21/04 |
| | | | 137/13 |
| 2014/0314563 A1* | 10/2014 | Mayrides | B64C 27/72 |
| | | | 416/1 |

OTHER PUBLICATIONS

Kohana Technologies: Blown Wing Technology, http://www.kohanatech.com/home, retrieved Mar. 12, 2018.

Dynamically Adjustable Wind Turbine Blades, Kohana Adaptive Turbine Blades: Blown Wing Technology for Low-Cost Wind Power, https://arpa-e.energy.gov/?q=slick-sheet-project/dynamically-adjustable-wind-turbine-blades, retrieved Mar. 12, 2018.

* cited by examiner

METHODS AND SYSTEMS FOR ROTARY WING ACTIVE FLOW CONTROL

FIELD

Embodiments of the present disclosure relate generally to flow over fluid dynamic surfaces. More particularly, embodiments of the present disclosure relate to improving fluid dynamic characteristics of flow over fluid dynamic surfaces.

BACKGROUND

Rotary devices, such as helicopters and wind turbines, experience reductions in performance when subject to cross flow. These reductions in performance may include loss of lift and increased vibration of the rotor blades, as examples. Active aerodynamic flow control has been shown to mitigate such effects. In one example, active flow control can be implemented by injecting air flow across the blade. However, a potential drawback of this method is the requirement of compressed air supply, which may be expensive and space prohibitive. As such, methods and systems for rotary wing active flow control without the need for a compressed air supply may be desirable.

SUMMARY

An enhanced performance rotorcraft rotor blade system and methods are disclosed. The present disclosure exploits the rotating blade dynamics of a rotary device to implement a turbo air compressor by using an air channel within the blade with an opening at the root and close at the tip. The centrifugal effect of rotating rotor blades generates a pressure gradient along the blade which can be used as a compressed air source for active flow control.

In one example, a system for a rotary device is provided comprising a rotor blade coupled to a rotor hub. The system also comprises an air channel disposed within the rotor blade, where the air channel is sealed proximate to a distal end of the rotor blade. The system also comprises an inlet positioned at a proximal end of the rotor blade, where the inlet is in fluid communication with the air channel. The system also comprises a plurality of outlets positioned along the rotor blade, where each of the plurality of outlets are in fluid communication with the air channel.

In another example, a rotary device is provided comprising a rotor hub, and one or more rotor blades coupled to the rotor hub. The rotary device also comprises an air channel disposed within each of the one or more rotor blades, where the air channel is sealed proximate to a distal end of each of the one or more rotor blades. The rotary device also comprises an inlet positioned at a proximal end of each of the one or more rotor blades, where the inlet is in fluid communication with the air channel. The rotary device also comprises a plurality of outlets positioned along each of the plurality of rotor blades, where each of the plurality of outlets are in fluid communication with the air channel. The rotary device also comprises one or more control valves positioned between the air channel and one or more of the plurality of outlets. The rotary device also comprises one or more sensors positioned on the one or more rotor blades. The rotary device also comprises a controller programmable to (i) determine an error condition of the rotary device based on data from the one or more sensors, and (ii) control the one or more control valves based on the determined error condition of the rotary device.

In still another example, a method is provided comprising receiving air flow into an air channel disposed within the rotor blade through an inlet positioned at a proximal end of the rotor blade, where the inlet is in fluid communication with the air channel, and where the air channel is sealed proximate to a distal end of the rotor blade. The method further comprises receiving the air flow into a plurality of outlets positioned along the rotor blade, where each of the plurality of outlets are in fluid communication with the air channel.

The features, functions, and advantages that have been discussed can be achieved independently in various embodiments or may be combined in yet other embodiments further details of which can be seen with reference to the following description and drawings.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, fluid dynamics, structures, control surfaces, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, a helicopter blade. Embodiments of the disclosure, however, are not limited to such a helicopter blade applications, and the techniques described herein may also be utilized in other fluid dynamic surface applications. For example, embodiments may be applicable to other lift surfaces of an aircraft such as a flap or a tail, a control surface of an aircraft such as an elevator and an aileron, an engine strut, a wind turbine blade, a hydrodynamic surface utilizing liquid (e.g., water) instead of air, a sail boat sail, an engine propeller, a windmill, and other application.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
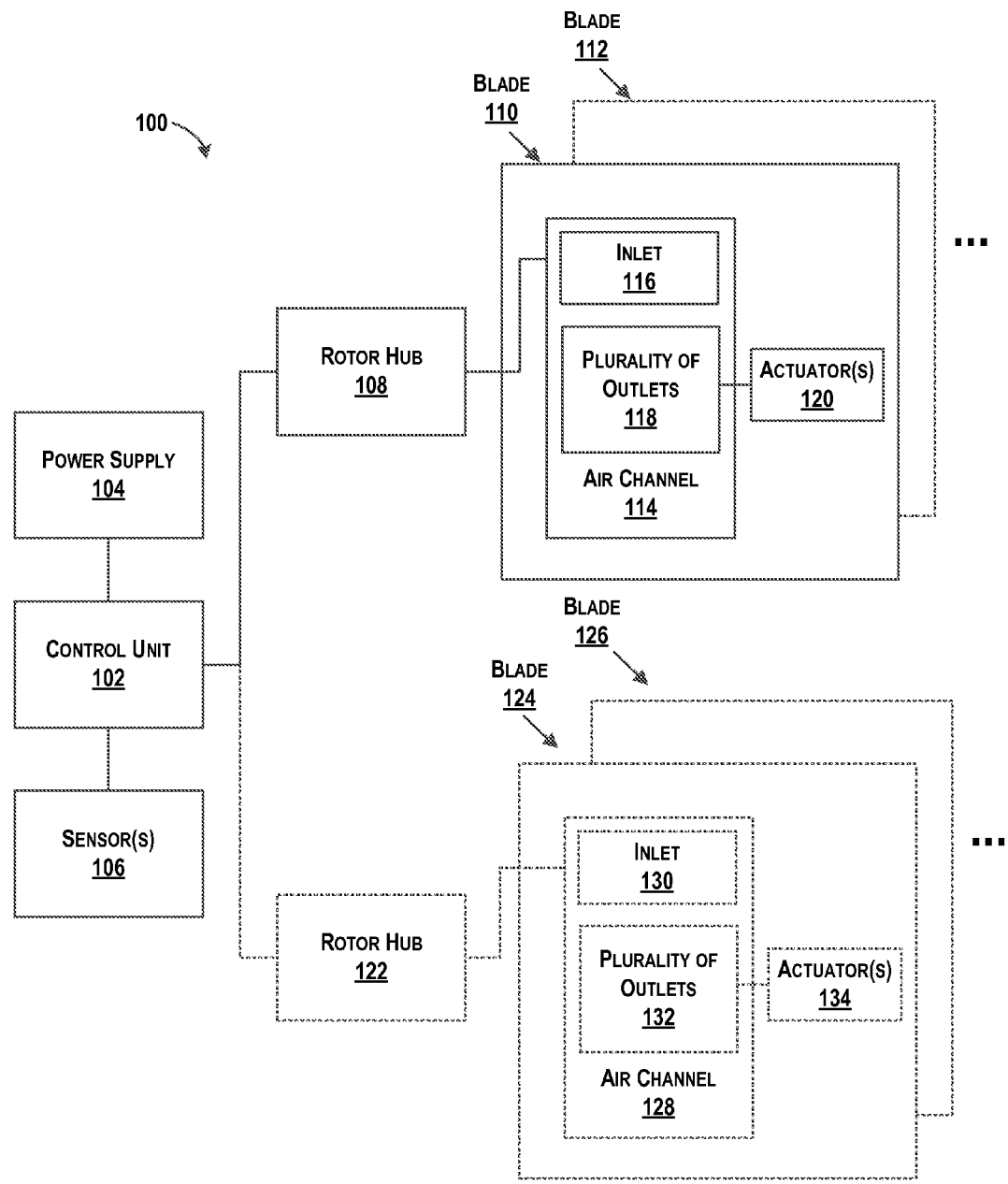
FIG. 1 is a block diagram of an example rotary device, according to one embodiment.

Referring now to the figures, FIG. 1 is a block diagram of an example rotary device 100, according to one embodiment. The rotary device 100 includes a control unit 102 coupled to a power supply 104 and sensor(s) 106. The control unit 102 is further coupled to a rotor hub 108 that connects to rotor blades 110 and 112. Each rotor blade 110 and 112 may include an air channel 114 disposed within the rotor blade 110. The air channel 114 is sealed proximate to a distal end of the rotor blade 110. The air channel 114 may include an inlet 116 positioned at a proximal end of the rotor blade 110. The inlet 116 may be in fluid communication with the air channel 114. Further, the air channel 114 may include a plurality of outlets 118 positioned along the rotor blade 110. The plurality of outlets 118 may be in fluid communication with the air channel 114. Within some examples, the rotary device 100 may include multiple rotors (e.g., such as a forward and an aft rotor), and thus, FIG. 1 illustrates an optional second rotor hub 122 coupled to the control unit 102, that also includes rotor blades 124 and 126. Each rotor blade 124 and 126 may also include an air channel 128 disposed within the rotor blade 110. Each rotor blade 124 and 126 may further include an inlet 130, and a plurality of outlets 132 each in fluid communication with the air channel 128.

As shown in FIG. 1, each rotor blade 110 may further include one or more actuators 120. The actuator(s) 120 are operable to open and close the plurality of outlets 118 in response to an actuation command. The actuation command may be generated by an input from a pilot/operator, a preprogrammed input from the control unit 102 in case of automated control, or a combination thereof. In one embodiment, the actuator(s) 120 are controlled via a control mechanism by the control unit 102 to control the plurality of outlets 118 based on various operation conditions as explained below. Any actuator known to those skilled in the art may be used for actuation of the plurality of outlets 118. For example but without limitation, a hydraulic actuator, a piezoelectric actuator, a spring loaded mechanism, a reverse flow blocking mechanism, a pyrotechnic actuator, a shape memory alloy actuator, or other actuator may be used. In one example, the actuator(s) 120 are controlled via pressurized air from the air channel 114. In another example, the actuator(s) 120 are controlled via the power supply 104. As shown in FIG. 1, the optional second rotor hub 122 may include one or more actuators 134 that are operable to open and close the plurality of outlets 132.

The rotary device 100 thus may be representative of a single rotor craft with an even number of multiple blades (e.g., four total blades, or two sets of blades) or of a multiple rotor craft (e.g., two rotors including a forward rotor and an aft rotor, where each rotor may include three or more blades, a lateral twin helicopter with a left and right rotor where each rotor may include three or more blades or a coaxial helicopter with an upper and lower rotor where each rotor may include three or more blades).

The control unit 102 may be configured to operate the actuator(s) 120, 134 on the rotor blades 110, 112, 124, and 126, and to provide power from the power supply 104 to do so. The control unit 102 may receive outputs from the sensors 106 to determine when to initiate operation of the actuator(s) 120, 134. The sensors 106 may include one or more gyroscopes, one or more accelerometers, one or more magnetometers, one or more light sensors, and/or one or more infrared sensors. The sensors 106 may more generally include sensors for detecting dynamic stall and/or vibrations in the rotary device 100. The sensors 106 may be positioned on the rotor blades 110, 112, 124, 126, or on another component of the rotary device 100.

The control unit 102 is configured to control the actuator(s) 120, 134 to open and close the plurality of outlets 118, 132 according to various operation conditions. The operation conditions may comprise, for example but without limitation, flight conditions, or other conditions. The flight conditions may comprise, for example but without limitation, take off, cruise, approach, landing, or other flight condition. Thus, the operation conditions may comprise for example but without limitation, an altitude, an airspeed, a rotation speed, a Mach number, a temperature, a vibration, or other parameter. In another example, the control unit 102 determines an error condition of the rotary device 100, and responsively controls the one or more actuator(s) 120, 134 based on the determined error condition. In one example, the error condition comprises sensor data indicative of dynamic stall of the rotary device 100. In another example, the error condition comprises sensor data indicative of vibrations on the rotary device 100. Other examples are possible as well.

Figure 2:
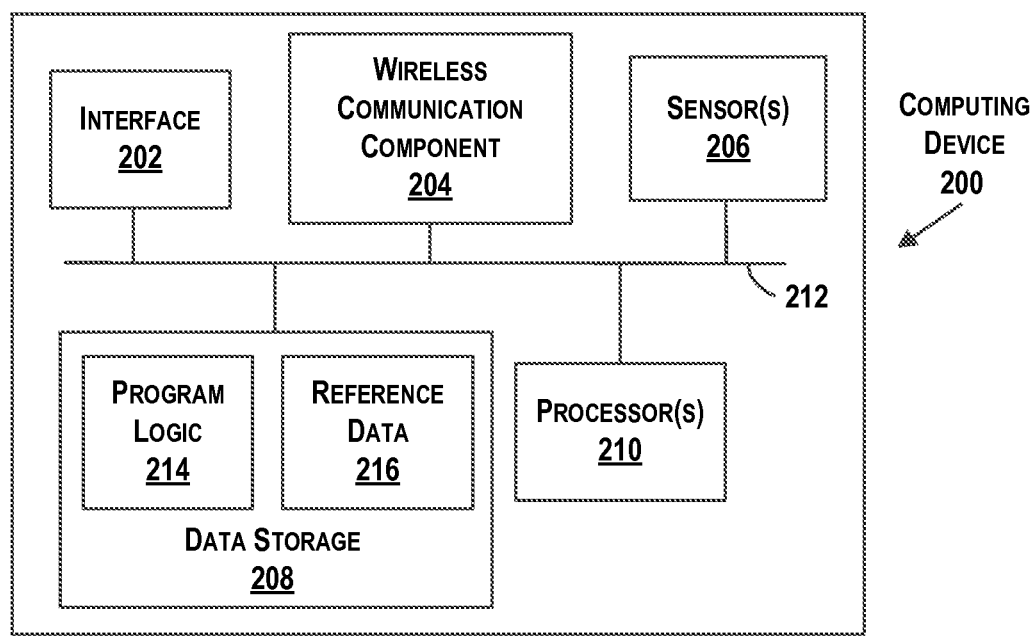
FIG. 2 illustrates a schematic drawing of an example computing device, according to one embodiment.

FIG. 2 illustrates a schematic drawing of an example computing device 200. The computing device 200 in FIG. 2 may represent the control unit 102 shown in FIG. 1. In some examples, some components illustrated in FIG. 2 may be distributed across multiple computing devices. However, for the sake of example, the components are shown and described as part of one example computing device 200. The computing device 200 may be implemented as, for example but without limitation, a part of an aircraft system, a centralized aircraft processor, a subsystem computing module devoted to the an enhanced performance rotorcraft rotor blade system, a wind turbine system, or other implementation.

The computing device 200 may include an interface 202, a wireless communication component 204, sensor(s) 206, data storage 208, and a processor 210. Components illustrated in FIG. 2 may be linked together by a communication link 212. The computing device 200 may also include hardware to enable communication within the computing device 200 and between the computing device 200 and another computing device (not shown), such as a server entity. The hardware may include transmitters, receivers, and antennas, for example.

The interface 202 may be configured to allow the computing device 200 to communicate with another computing device (not shown), such as a server or land-based device. Thus, the interface 202 may be configured to receive input data from one or more computing devices, and may also be configured to send output data to the one or more computing devices. In some examples, the interface 202 may also maintain and manage records of data received and sent by the computing device 200. The interface 202 may also include a receiver and transmitter to receive and send data.

The wireless communication component 204 may be a communication interface that is configured to facilitate wireless data communication for the computing device 200 according to one or more wireless communication standards. For example, the wireless communication component 204 may include a Wi-Fi communication component, or a cellular communication component. Other examples are also possible, such as proprietary wireless communication devices.

The sensor(s) 206 may include one or more sensors, or may represent one or more sensors included within the computing device 200. Example sensors may include one or more gyroscopes, one or more accelerometers, one or more magnetometers, one or more light sensors, and/or one or more infrared sensors, or any of the sensors 106 shown in FIG. 1 may be incorporated into the computing device 200. The sensors 106 may more generally include sensors for detecting dynamic stall and/or vibrations in the rotary device 100.

The processor 210 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The data storage 208 may contain program logic 214 and reference data 216. Reference data 210 is configured to store, maintain, and provide data as needed to support the functionality of the system. For example, the reference data 216 may store flight configuration data, actuator command signals, or other data. Program logic 214, in turn, may then comprise machine language instructions or the like that are executable by the processing unit 204 to carry out various functions described herein.

In practical embodiments, the data storage 208 may comprise, for example but without limitation, a non-volatile storage device (non-volatile semiconductor memory, hard disk device, optical disk device, and the like), a random access storage device (for example, SRAM, DRAM), or any other form of storage medium known in the art.

The data storage 208 may be coupled to the processor 210 and configured to store, for example but without limitation, a database, and the like. Additionally, the data storage 208 may represent a dynamically updating database containing a table for updating the database, and the like. The data storage 208 may be coupled to the processor 210 such that the processor 210 can read information from and write information to the data storage 208. For example, the processor 210 may access the data storage 208 to access an aircraft speed, a flight control surface position, an angle of attack, a rotation speed of a rotor, a Mach number, an altitude, or other data.

As an example, the processor 210 and data storage 208 may reside in respective application specific integrated circuits (ASICs). The data storage 208 may also be integrated into the processor 210. In an embodiment, the data storage 208 may comprise a cache memory for storing temporary variables or other intermediate information during execution of instructions to be executed by the processor 210.

Figure 3A:
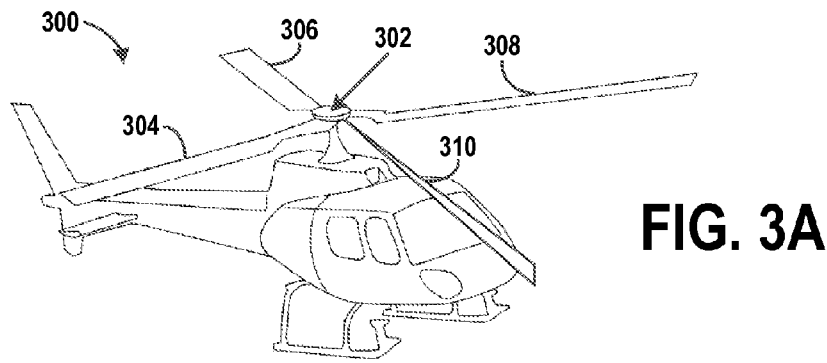
FIG. 3A is an example rotor craft with a main single rotor and four blades, according to one embodiment.
Figure 3B:
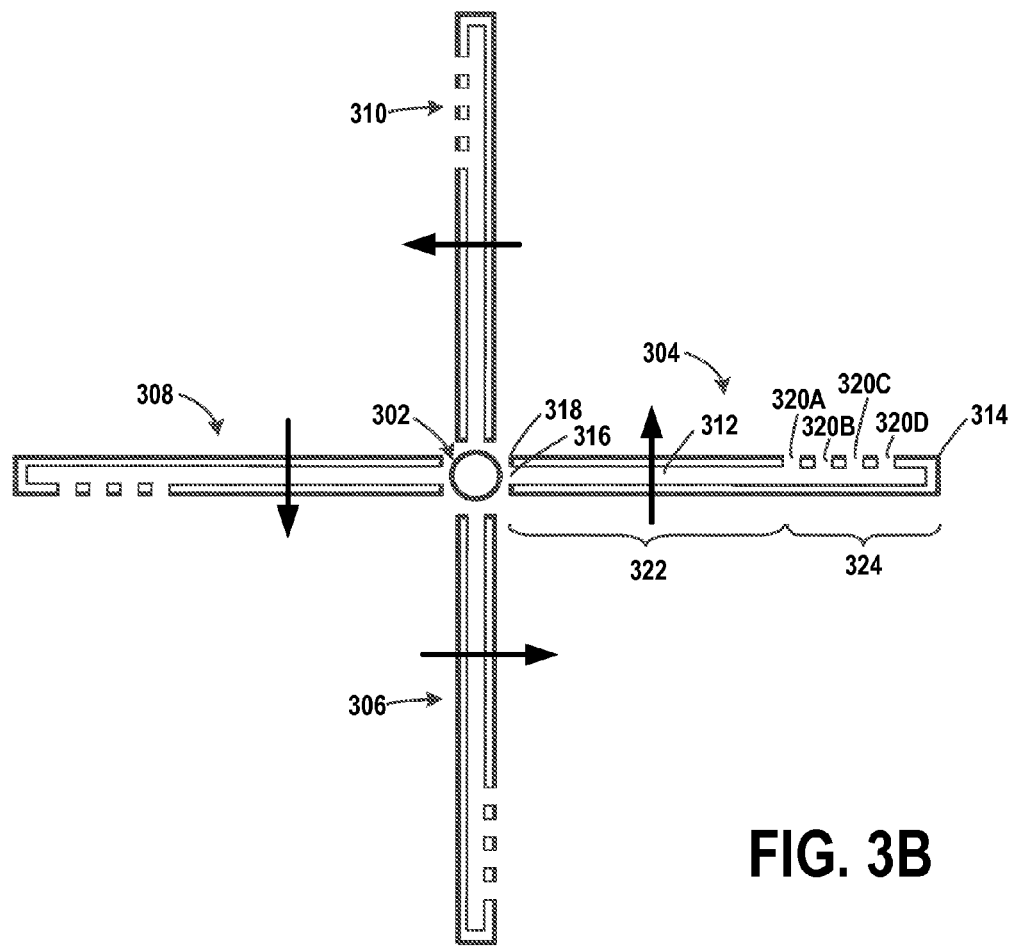
FIG. 3B illustrates the example blades of the rotor craft in FIG. 3A, according to one embodiment.

FIG. 3A is an example rotary craft 300 with a rotor hub 302 and four rotor blades 304, 306, 308, and 310, according to one embodiment. FIG. 3B illustrates the example rotor blades 304, 306, 308, and 310 of the rotary craft 300 in FIG. 3A, according to one embodiment.

In FIG. 3B, each of the blades includes an air channel 312 disposed within the rotor blade. As shown in FIG. 3B, the air channel 312 is sealed proximate to the distal end 314 of the rotor blade. In one example, the air channel 312 may be an existing spar of the rotor blade. As shown in FIG. 3B, the air channel 312 may have a uniform cross-section. In another example, the air channel 312 may have a variable cross-section along the length of the rotor blade. For example, the proximal end 318 of the air channel 312 may have a greater cross-section than the distal end 314 of the air channel 312. In another example, the distal end 314 may have a greater cross-section than the proximal end 318 of the air channel 312. Each rotor blade also includes an inlet 316 positioned at the proximal end 318 of the rotor blade. The inlet 316 is in fluid communication with the air channel 312. Further, each rotor blade includes a plurality of outlets 320A, 320B, 320C, 320D positioned along the rotor blade. As shown in FIG. 3B, each of the plurality of outlets 320A, 320B, 320C, 320D are in fluid communication with the air channel 312.

As shown in FIG. 3B, each rotor blade may be divided into an inboard section 322 that extends from the rotor hub 302 outward, and an outboard section 324 that extends from the inboard section 322 to the distal end 314 of the rotor blade 304. In one example, the plurality of outlets 320A, 320B, 320C, 320D are positioned only along the outboard section 324. The outboard section 324 may be approximately the distal third of the rotor blade 304. In another example, the outboard section 324 may be approximately the distal quarter of the rotor blade 304. In another example, the plurality of outlets 320A, 320B, 320C, 320D are positioned along the entire length of the rotor blade 304. The other rotor blades 306, 308, 310 may be configured in the same manner.

In operation, the rotor blades 304, 306, 308, 310 rotate about a center point, namely the rotor hub 302. Mechanically, in operation an angle of attack of the rotor blades 304, 306, 308, 310 are changed to increase or decrease lift and thrust. With the angle of attack reduced on a retreating blade to prevent stall, lift is also generally reduced, which can have an effect almost as if stalled, since high angles of attack generally promote a stall. Since the rotor blades 304, 306, 308, 310 rotate in a radial pattern, the distal end 314 of each blade at an outmost point (e.g., outmost from the rotor hub 302) of the rotor blades obtain a rotational or tangential velocity far greater than the proximal end 318 of the rotor blades closest to the rotor hub 302. As such, the centrifugal effect of the rotation of the rotor blades will generate a pressure gradient along the air channel 312. This pressure gradient can be used as a compressed air source to expel air out of the plurality of outlets 320A, 320B, 320C, 320D to inject air flow along the blade to prevent dynamic stall and/or reduce vibrations. By using the pressure gradient along the blade to create compressed air, the system does not require an external compressed air supply.

Figure 3C:
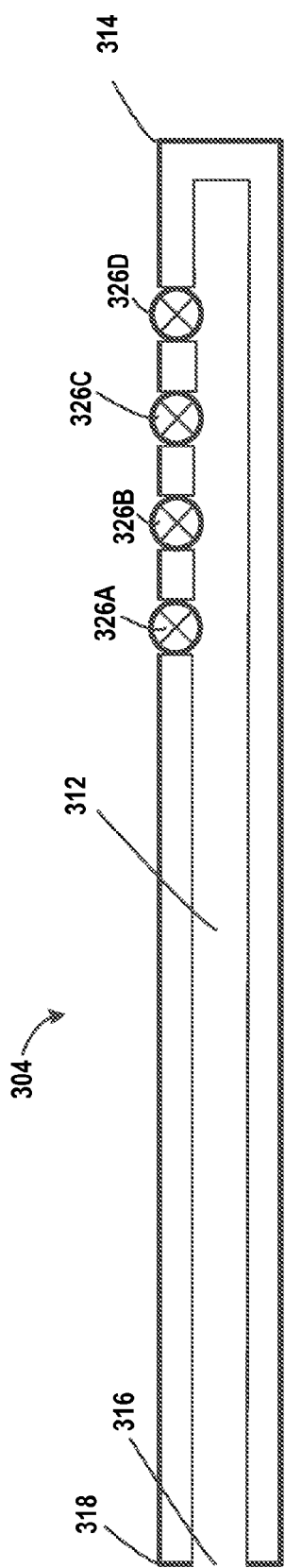
FIG. 3C illustrates example flow control mechanisms positioned on the example blades of the rotor craft in FIG. 3A, according to example embodiments.

FIG. 3C illustrates example flow control mechanisms 326A, 326B, 326C, 326D positioned between the air channel 312 and the plurality of outlets 320A, 320B, 320C, 320D in the example blades of the rotary craft 300 in FIG. 3A. The flow control mechanisms 326A, 326B, 326C, 326D may take a variety of forms. In one example, the flow control mechanisms 326A, 326B, 326C, 326D comprise a plurality of pressure regulators positioned between the air channel 312 and the plurality of outlets 320A, 320B, 320C, 320D. In another example, the flow control mechanisms 326A, 326B, 326C, 326D comprise a plurality of fluidic oscillators positioned between the air channel 312 and the plurality of outlets 320A, 320B, 320C, 320D.

In yet another example, the flow control mechanisms 326A, 326B, 326C, 326D comprise a plurality of control valves positioned between the air channel 312 and the plurality of outlets 320A, 320B, 320C, 320D. The control valves may be configured to open and close the plurality of outlets 320A, 320B, 320C, 320D via one or more actuators. For example but without limitation, a hydraulic actuator, a piezoelectric actuator, a spring loaded mechanism, a reverse flow blocking mechanism, a pyrotechnic actuator, a shape memory alloy actuator, or other actuator may be used.

Each of the control valves/actuators may be coupled to a control unit, such as shown in FIG. 1. As such, each of the control valves for each blade and each rotor may be individually controlled to open and close the plurality of outlets 320A, 320B, 320C, 320D according to various operation conditions. As described above, such operation conditions may comprise for example but without limitation, an altitude, an airspeed, a rotation speed, a Mach number, a temperature, a vibration, or other parameter. In another example, an example control unit determines an error condition of the rotary craft 300, and responsively controls the one or more control valves based on the determined error condition. In one example, the error condition comprises sensor data indicative of dynamic stall of the rotary craft 300. In another example, the error condition comprises sensor data indicative of vibrations on the rotary craft 300. Other examples are possible as well.

In one example, an example control unit may activate the plurality of control valves to open and close the plurality of outlets 320A, 320B, 320C, 320D over certain portions of the rotation of the rotor blades. In another example, the example control unit may open the control valves in a given sequence, such that at least one of the plurality of outlets 320A, 320B, 320C, 320D is closed while others are open. In yet another example, the example control unit may store performance data over time, and use the stored performance data to determine an optimal process to open and close the control valves to maximize performance of the rotary craft 300.

In addition, the rotor blade 304 may include one or more actuators in fluid communication with the one or more of the plurality of outlets 320A, 320B, 320C, 320D. Such actuators may be controlled via pressurized air from the air channel 312. For example, one or more vortex generators may be in fluid communication with one or more of the plurality of outlets 320A, 320B, 320C, 320D. In another example, one or more powered flaps positioned on the rotor blade 304 may be in fluid communication with one or more of the plurality of outlets 320A, 320B, 320C, 320D. Other examples are possible as well.

Figure 4A:
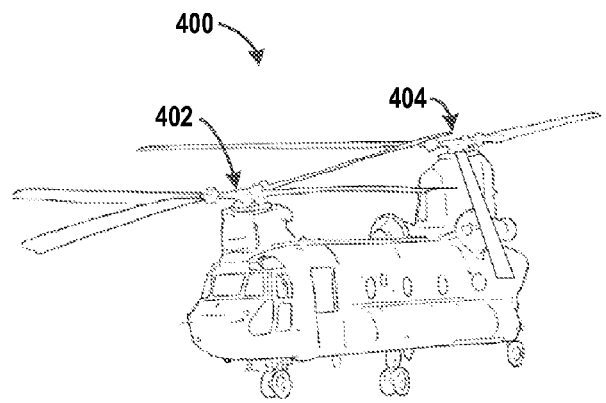
FIG. 4A is an example rotor craft with multiple rotors and three blades for each rotor, according to one embodiment.
Figure 4B:
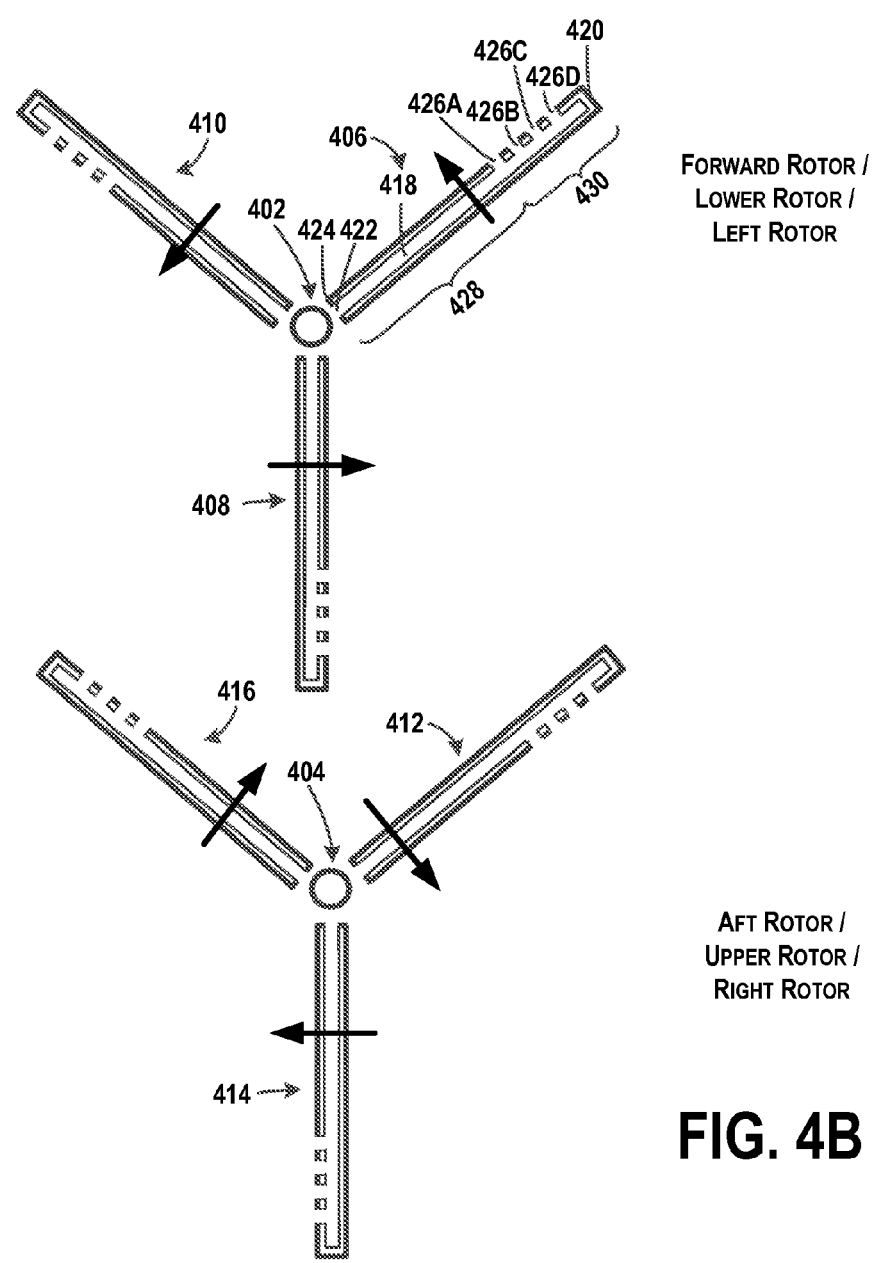
FIG. 4B illustrates example blades of the forward rotor, and example blades of the aft rotor of the rotor craft in FIG. 4A, according to one embodiment.

FIG. 4A is an example rotor craft 400 with multiple rotor hubs 402 and 404 and three blades for each rotor hub, according to one embodiment. In FIG. 4A, the rotor craft 400 includes a forward rotor hub 402 and an aft rotor hub 404. As shown, the forward rotor hub 402 may be provided proximal to a front end of the rotor craft 400 and the aft rotor hub 404 may be provided proximal to a rear of the rotor craft 400. FIG. 4B illustrates example blades 406, 408, and 410 of the forward rotor hub 402, and example blades 412, 414, and 416 of the aft rotor hub 404, according to one embodiment. Although FIG. 4A illustrates an aircraft with a forward and aft rotor hub, the system described below may alternatively or additionally be implemented on a multiple rotor aircraft in which the rotors are configured as a left and a right rotor, or as an upper and a lower rotor, for example.

In FIG. 4B, each of the blades includes an air channel 418 disposed within the rotor blade. As shown in FIG. 4B, the air channel 418 is sealed proximate to the distal end 420 of the rotor blade. In one example, the air channel 418 may be an existing spar of the rotor blade. As shown in FIG. 4B, the air channel 418 may have a uniform cross-section. In another example, the air channel 418 may have a variable cross-section along the length of the rotor blade 406. Each rotor blade also includes an inlet 422 positioned at the proximal end 424 of the rotor blade. The inlet 422 is in fluid communication with the air channel 418. Further, each rotor blade includes a plurality of outlets 426A, 426B, 426C, 426D positioned along the rotor blade. As shown in FIG. 4B, each of the plurality of outlets 426A, 426B, 426C, 426D are in fluid communication with the air channel 418.

As shown in FIG. 4B, each rotor blade may be divided into an inboard section 428 that extends from the rotor hub 402 outward, and an outboard section 430 that extends from the inboard section 428 to the distal end 420 of the blade. In one example, the plurality of outlets 426A, 426B, 426C, 426D are positioned only along the outboard section 430. The outboard section 430 may be approximately the distal third of the rotor blade 406. In another example, the outboard section 430 may be approximately the distal quarter of the rotor blade 406. In another example, the plurality of outlets 426A, 426B, 426C, 426D are positioned along the entire length of the rotor blade 406. The other rotor blades 408, 410, 412, 414, 416 may be configured in the same manner. In addition, the rotor blades 406, 408, 410, 412, 414, 416 may include one or more flow control mechanisms, such as flow control mechanisms 326A, 326B, 326C, 326D discussed above in relation to FIG. 3C.

Figure 5:
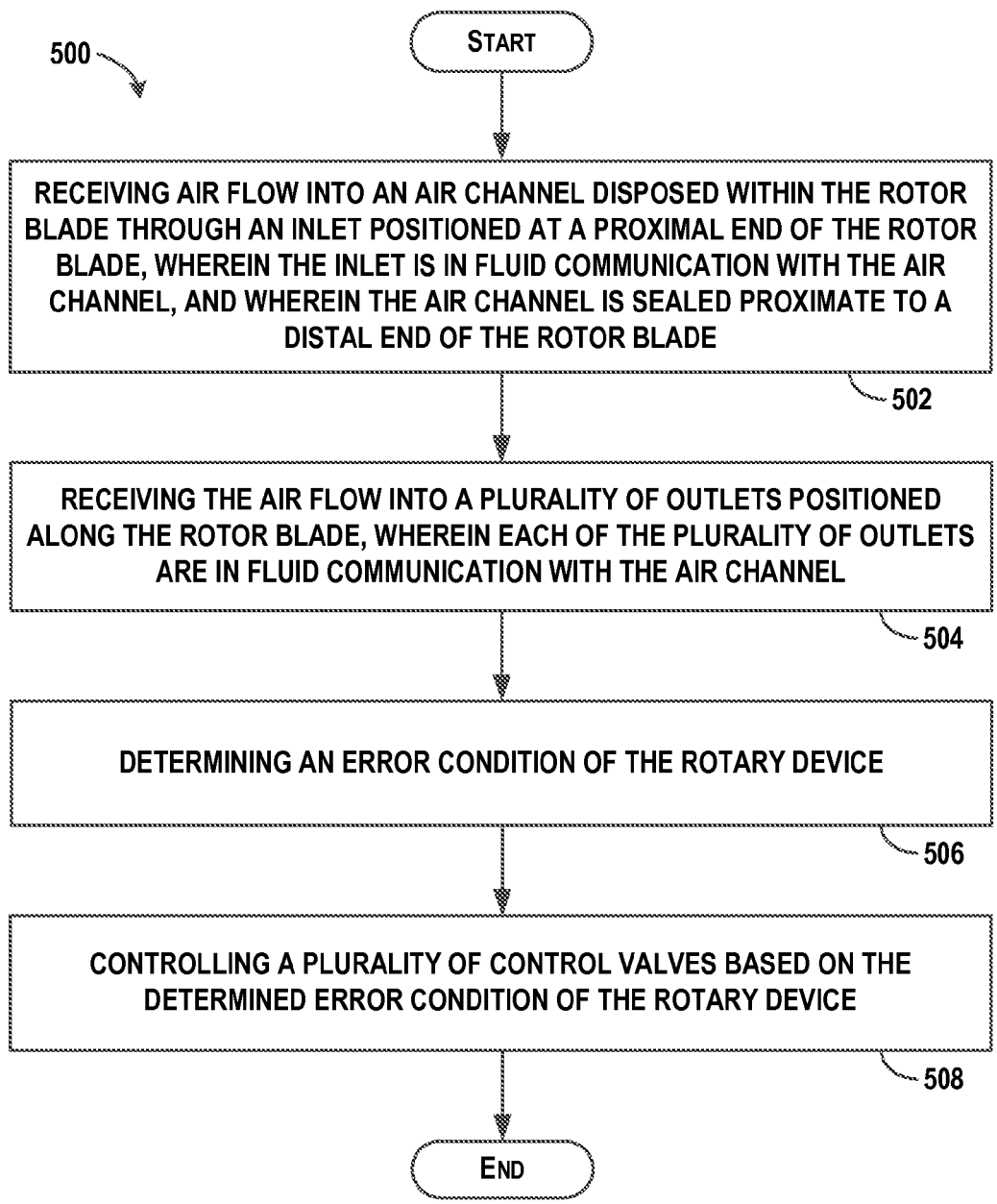
FIG. 5 shows a flowchart of an example method for operation of heater systems on a rotor craft, according to one embodiment.

FIG. 5 shows a flowchart of an example method 500 for operation of heater systems on a rotor craft, according to one embodiment. Method 500 shown in FIG. 5 presents an embodiment of a method that, for example, could be used with the system shown in FIG. 1, for example, and may be performed by a computing device (or components of a computing device), or may be performed by components of the rotorcraft according to instructions provided by the computing device. Thus, example devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions. Method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 5 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 502, the method 500 includes receiving air flow into an air channel disposed within the rotor blade through an inlet positioned at a proximal end of the rotor blade, wherein the inlet is in fluid communication with the air channel, and wherein the air channel is sealed proximate to a distal end of the rotor blade. As discussed above, a rotor craft may include multiple rotor blades coupled to a rotor hub and the multiple blades include a first set of blades and a second set of blades.

At block 504, the method 500 includes receiving the air flow into a plurality of outlets positioned along the rotor blade, wherein each of the plurality of outlets are in fluid communication with the air channel.

At block 506, the method 500 includes determining an error condition of the rotary device. In one example, the error condition comprises sensor data indicative of dynamic stall of the rotary device. In another example, the error condition comprises sensor data indicative of vibrations on the rotary device. Other examples are possible as well.

At block 508, the method 500 includes controlling the plurality of control valves based on the determined error condition of the rotary device. As discussed above, each of the control valves may be coupled to a control unit, such as the control unit shown in FIG. 1. As such, each of the control valves for each blade and each rotor may be individually controlled to open and close the plurality of outlets according to various error conditions. Controlling the plurality of control valves may take various forms. In one example, an example control unit may activate the plurality of control valves to open and close the plurality of outlets over certain portions of the rotation of the rotor blades. In another example, the example control unit may open the control valves in a given sequence, such that at least one of the plurality of outlets is closed while others are open. In yet another example, the example control unit may store performance data over time, and use the stored performance data to determine an optimal process to open and close the control valves to maximize performance of the rotary device.

Within examples, the method 500 may be repeated by opening and/or closing the plurality of outlets until the one or more error conditions are no longer present.

Examples described herein enable a reduction in performance issues due to cross flow along rotor blades of various rotary devices, such as loss of lift and increased vibration. Using the rotating blade dynamics to create a pressure gradient along the rotor blade enables the rotary device to inject air flow along the blade without the need for an external compressed air supply. The air flow along the blade mitigates the reduction in performance, enabling increased performance of the rotary device.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system for a rotary device, the system comprising:
a rotor blade coupled to a rotor hub;
an air channel disposed within the rotor blade, wherein the air channel is sealed proximate to a distal end of the rotor blade;
an inlet positioned at a proximal end of the rotor blade, wherein the inlet is in fluid communication with the air channel, and wherein a centrifugal effect of a rotation of the rotor blade generates a pressure gradient along the air channel to create a compressed air source for active flow control;
a plurality of outlets positioned along the rotor blade, wherein each of the plurality of outlets are in fluid communication with the air channel; and
a plurality of control valves positioned between the air channel and each of the plurality of outlets, wherein the plurality of control valves are configured to open and close via one or more actuators, and wherein the one or more actuators are controlled via the compressed air source from the pressure gradient along the air channel.

2. The system of claim 1, wherein the rotary device comprises a helicopter.

3. The system of claim 1, wherein the rotary device comprises a wind turbine.

4. The system of claim 1, wherein the at least one rotor blade is a plurality of rotor blades.

5. The system of claim 1, wherein the plurality of outlets are positioned along a distal third of the at least one rotor blade.

6. The system of claim 1, wherein the plurality of outlets are positioned along a distal quarter of the at least one rotor blade.

7. The system of claim 1, further comprising a plurality of pressure regulators positioned between the air channel and each of the plurality of outlets.

8. The system of claim 1, further comprising a plurality of fluidic oscillators positioned between the air channel and each of the plurality of outlets.

9. The system of claim 1, further comprising:
a processor configured to determine an error condition of the rotary device; and
a control system configured to control the one or more actuators of the plurality of control valves based on the determined error condition of the rotary device.

10. The system of claim 9, wherein the error condition comprises sensor data indicative of dynamic stall of the rotary device.

11. The system of claim 9, wherein the error condition comprises sensor data indicative of vibrations on the rotary device.

12. The system of claim 1, further comprising one or more vortex generators in fluid communication with one or more of the plurality of outlets.

13. The system of claim 1, further comprising one or more powered flaps positioned on the at least one rotor blade, wherein the one or more powered flaps are controlled via the compressed air source from the pressure gradient along the air channel.

14. A rotary device, comprising:
a rotor hub;
one or more rotor blades coupled to the rotor hub;
an air channel disposed within each of the one or more rotor blades, wherein the air channel is sealed proximate to a distal end of each of the one or more rotor blades;
an inlet positioned at a proximal end of each of the one or more rotor blades, wherein the inlet is in fluid communication with the air channel, and wherein a centrifugal effect of a rotation of the rotor blade generates a pressure gradient along the air channel to create a compressed air source for active flow control;
a plurality of outlets positioned along each of the plurality of rotor blades, wherein each of the plurality of outlets are in fluid communication with the air channel;
a plurality of control valves positioned between the air channel and each of the plurality of outlets, wherein the plurality of control valves are configured to open and close via one or more actuators, and wherein the one or more actuators are controlled via the compressed air source from the pressure gradient along the air channel;
one or more sensors positioned on the one or more rotor blades; and
a controller programmable to (i) determine an error condition of the rotary device based on data from the one or more sensors, and (ii) control the one or more actuators of the plurality of control valves based on the determined error condition of the rotary device.

15. The rotary device of claim 14, wherein the error condition comprises sensor data indicative of dynamic stall of the rotary device.

16. The rotary device of claim 14, wherein the error condition comprises sensor data indicative of vibrations on the rotary device.

17. A method for creating a pressure gradient in a rotor blade of a rotary device, the method comprising:
receiving air flow into an air channel disposed within the rotor blade through an inlet positioned at a proximal end of the rotor blade, wherein the inlet is in fluid communication with the air channel, wherein the air channel is sealed proximate to a distal end of the rotor blade, and wherein a centrifugal effect of a rotation of the rotor blade generates a pressure gradient along the air channel to create a compressed air source for active flow control; and
receiving pressurized air from the compressed air source into a plurality of outlets positioned along the rotor blade, wherein each of the plurality of outlets are in fluid communication with the air channel, wherein the rotary device includes a plurality of control valves positioned between the air channel and each of the plurality of outlets, wherein the plurality of control valves are configured to open and close via one or more actuators, and wherein the one or more actuators are controlled via the compressed air source from the pressure gradient along the air channel.

18. The method of claim 17, further comprising:
determining an error condition of the rotary device; and
controlling the one or more actuators of the plurality of control valves based on the determined error condition of the rotary device.

* * * * *